United States Patent [19]

Brock

[11] Patent Number: 4,706,893

[45] Date of Patent: Nov. 17, 1987

[54] METHOD AND APPARATUS FOR RECYCLING ROOFING SHINGLES AS AN ADDITIVE TO ASPHALT PAVING COMPOSITION

[75] Inventor: James D. Brock, Chattanooga, Tenn.

[73] Assignee: Astec Industries, Inc., Chattanooga, Tenn.

[21] Appl. No.: 882,475

[22] Filed: Jul. 7, 1986

[51] Int. Cl.[4] .............................................. B02C 19/12
[52] U.S. Cl. ...................................... 241/23; 241/34; 241/65; 241/101 B; 366/18
[58] Field of Search .................. 366/8, 18; 208/39, 45; 222/63, 135, 58; 209/3, 11; 241/46.17, 21, 34, 101 D, 23, 35, 46.02, 101 B, 299, 26, 186 R, 189 R, 186.3, 65

[56] References Cited

U.S. PATENT DOCUMENTS

| | | | |
|---|---|---|---|
| 3,825,192 | 7/1974 | Knight | 241/186 R |
| 4,210,290 | 7/1980 | Andersson et al. | 241/34 X |
| 4,325,641 | 4/1982 | Babus et al. | 241/46.17 X |
| 4,627,577 | 12/1986 | Hyuga et al. | 241/34 X |

Primary Examiner—Mark Rosenbaum
Attorney, Agent, or Firm—Jones, Askew & Lunsford

[57] ABSTRACT

A method and apparatus for recycling asphalt shingles in an asphalt plant which heats and dries aggregate and mixes the heated and dried aggregate with liquid asphalt to form an asphalt paving composition. The shingles are comminuted to particles of a size which can be easily flowed and metered, and the shingle particles are introduced into the asphalt plant such that they are heated to melt the asphalt in the shingle particles. The aggregate, heated shingle particles, and liquid asphalt are thoroughly mixed to form an asphalt paving composition.

34 Claims, 1 Drawing Figure

METHOD AND APPARATUS FOR RECYCLING ROOFING SHINGLES AS AN ADDITIVE TO ASPHALT PAVING COMPOSITION

TECHNICAL FIELD

This invention relates generally to the manufacture of asphalt paving composition, and relates more specifically to a method and apparatus for recycling asphaltic roofing shingles as an additive in asphalt paving composition.

BACKGROUND OF THE INVENTION

Methods and apparatus for manufacturing asphaltic paving composition are well known. Typically, virgin aggregate is heated and dried in a rotating drum, and then liquid asphalt is mixed with the heated aggregate, typically in the proportion of 5% to 6% asphalt by weight, to form the paving composition. This mixing can be done in the lower end of the same rotating drum in a zone removed from the heat source, or the aggregate and asphalt can be mixed in a separate mixing apparatus. Optionally, recycled asphalt roadway material can be mixed with the aggregate in a zone of the drum which is hot enough to melt the asphalt in the recycled roadway material but not so hot as to cause excessive smoking.

Each year, there are approximately 80,000,000 squares of roofing shingles produced. A square is 100 square feet of shingles and contains approximately 80 shingles weighing a total of approximately 235 pounds. Typically, shingles manufactured prior to 1980 consist of 25% granular material and 75% binder. The binder consists of 70% asphalt and 30% limestone filler, resulting in a total composition of 52.5% asphalt. Shingles manufactured subsequent to 1980 typically consist of 25% asphalt, 25% fiberglass, and 50% granular/filler material.

Approximately 60% of roofing shingles are used for new construction and 40% for old construction. A building can be re-roofed three times prior to having to tear the old shingles off, but when the shingles are removed, all three layers are removed. Therefore, eventually as much as 40% of the shingles produced will be disposed of. Accordingly, with 80,000,000 squares of shingles being produced each year, even with the newer shingles containing only 25% asphalt, 2,275,000 tons of liquid asphalt per year are being disposed of.

In addition to disposing of old shingles, there is considerable waste associated with the manufacture of new shingles. Each shingle has three tabs cut out which measure one-quarter inch by 5". This represents approximately 2½% of each shingle which is cut out as tabs. Based upon the annual output of new shingles, approximately 80,000 tons of tabs are disposed of each year, resulting in the waste of at least 20,000 tons of asphalt, plus the granular and filler material which are also byproducts of a roofing plant.

Finally, of the new shingles which are manufactured, a certain percentage of the shingles, known as "seconds", will be of unacceptable quality. It is estimated that the amount of shingle material disposed of as "seconds" is approximately equal to the amount of shingle material disposed of as tabs.

Accordingly, there is a need to provide a method and apparatus by which old shingles and shingle material which is the by-product of the manufacture of new shingles can be recycled.

Various methods for recovering the components of discarded asphalt shingles are known in the art. One such example is found in U.S. Pat. No. 4,222,851, in which a solid extracting process is used to recover the various components. Waste asphalt shingles are shredded in a hammer mill and then passed through an extractor-desolventizer so as to form an asphalt-enriched miscella. The miscella is then subjected to evaporative techniques to separate asphalt from the solvent, and the solid particles are further segregated into their fiber, filler, and granular component parts.

U.S. Pat. No. 4,269,693 discloses a process for recovering bitumen from waste roofing felt and the like. The cooled waste material is comminuted to a particle size of less than 5 mm, such as by using a chain flail device. The comminuted particles are then fed into a tank of water, where the dirt and stone chippings drop to the bottom of the tank while the bitumen and fibers float at or near the surface of the water where they can be skimmed off.

As can be seen, these prior art processes are complicated and time consuming and require special equipment to separate waste shingles into their component parts. Accordingly, there is a need to provide a method and apparatus for recycling waste shingles which does not require separation of the shingle material into its component parts.

The primary components of shingles—asphalt and filler material—are similar to the components comprising asphalt paving composition. Accordingly, efforts have been made to recycle waste shingle material as an additive to asphalt paving composition, whereby all of the materials comprising the shingle can be utilized without separating the shingle material into its component parts. One such effort involved shredding roofing shingles into chunks that would sometimes be as large as 4 inches by 6 inches. These chunks of shingle material were then injected into a batch plant by weighing them into the plant like recycle material. However, these efforts were largely unsuccessful because the large chunks of shingle material would not completely melt down, and consequently would not uniformly intersperse with the remainder of the asphalt mix. Also, with chunks of shingle material so large, it is difficult to maintain the asphaltic content of the mix within the close standards required by state laws. Due to the high percentage of asphalt in the roofing shingles, even slight errors in weighing the shingle material into the asphalt plant can result in relatively large errors in the asphalt content of the road material.

A further problem which has been associated with prior art efforts to recycle waste shingles concerns the difficulty in shredding shingles on a mass basis. Because of their high granular material content, shingles act like large pieces of sandpaper. Thus, a large pile of shingles tends to be nearly impossible to drag, flow, separate, or handle. Because the waste shingles tend to hang together in a mass, it has been difficult to handle and weigh a predetermined quantity of shingle material.

Accordingly, there is a need to provide a method and apparatus whereby shingles can be handled, separated, flowed, and metered rather than hanging together as a large mass.

SUMMARY OF THE INVENTION

As will be seen, the present invention overcomes these and other problems associated with prior art methods and apparatus for recycling waste shingles. Stated generally, the present invention comprises a method and apparatus whereby waste shingles are heated to liquify the asphalt and then mixed with aggregate and additional liquid asphalt to form a paving composition.

Stated somewhat more specifically, according to the present invention waste shingles are shredded into small particles such that they can be accurately weighed and metered without moving as a large mass. The shingle particles are fed into an area of a drying drum which has a temperature high enough to melt the asphalt but not so high as to cause excessive smoking. Additional liquid asphalt is added to bring the total asphalt content of the mixture to the desired level, and the aggregate, shingle material, and liquid asphalt are thoroughly mixed.

Stated more specifically, the present invention includes a horizontal woodhog such as is used in the wood processing industry, to feed waste shingles into a hammer mill. The woodhog includes a chain feeder with an upper holddown conveyor running in the same direction to provide a positive feed. If a stack of material exceeding a predetermined depth is fed onto the woodhog, the top conveyor reverses, pulling the material on top of the pile backwards until the hammer mill has consumed the material on the bottom. At that time, the upper material will drop down and feed into the mill. The hammer mill is of conventional design and comminutes the shingles into particles of one-quarter inch or less.

The shingle particles are continuously weighed and fed into the asphalt plant at a rate proportional to the rate at which aggregate is fed into the drum mixer. In this manner, the recycled shingles will comprise a controlled percentage of the asphalt product. The shingle particles are heated in the drying zone of the drum mixer along with the aggregate to melt the asphalt in the shingle particles. Since the weight of recycled shingle material fed into the mixer is known, and since the percentage of asphalt in the shingle material is known, the amount of asphalt in the mix by way of the recycled shingle material can be computed. Since the amount of total asphalt desired in the paving composition is known, the amount of liquid asphalt introduced into the asphalt plant to be mixed with the aggregate and shingle particles can be controlled to provide the proper total asphaltic content.

If desired, reclaimed roadway material can also be introduced into the drum dryer along with the shingle material. The heat of the drum will melt the asphalt in the reclaimed roadway material in the same manner in which the asphalt in the shingle particles is melted. By controlling the rate at which reclaimed roadway material is introduced into the drum, since the percentage of asphalt in the reclaimed material is known, the amount of liquid asphalt can be adjusted downwardly so that the total asphalt content of the paving composition is of the desired level.

Thus, it is an object of the present invention to provide a method and apparatus for recycling waste shingle material.

It is a further object of the present invention to provide a method and apparatus for recycling shingle material which does not require that the material be separated into its component parts.

It is another object of the present invention to provide a method and apparatus whereby waste shingle material can be used as an additive in asphalt paving composition.

It is another object of the present invention to provide a method and apparatus whereby waste shingle material and reclaimed roadway material may be recycled as additives in asphalt paving composition.

It is yet another object of the present invention to provide a method and apparatus for manufacturing asphalt paving composition whereby waste shingle material is employed to conserve liquid asphalt.

Another object of the present invention is to provide a method and apparatus for recycling waste shingle material as an additive in asphalt paving composition whereby the asphaltic content of the end product can be maintained within close tolerances.

Other objects, features, and advantages of the present invention will become apparent upon reading the following specification when taken in conjunction with the drawings and the appended claims.

DESCRIPTION OF THE DISCLOSED EMBODIMENT

Figure 1:
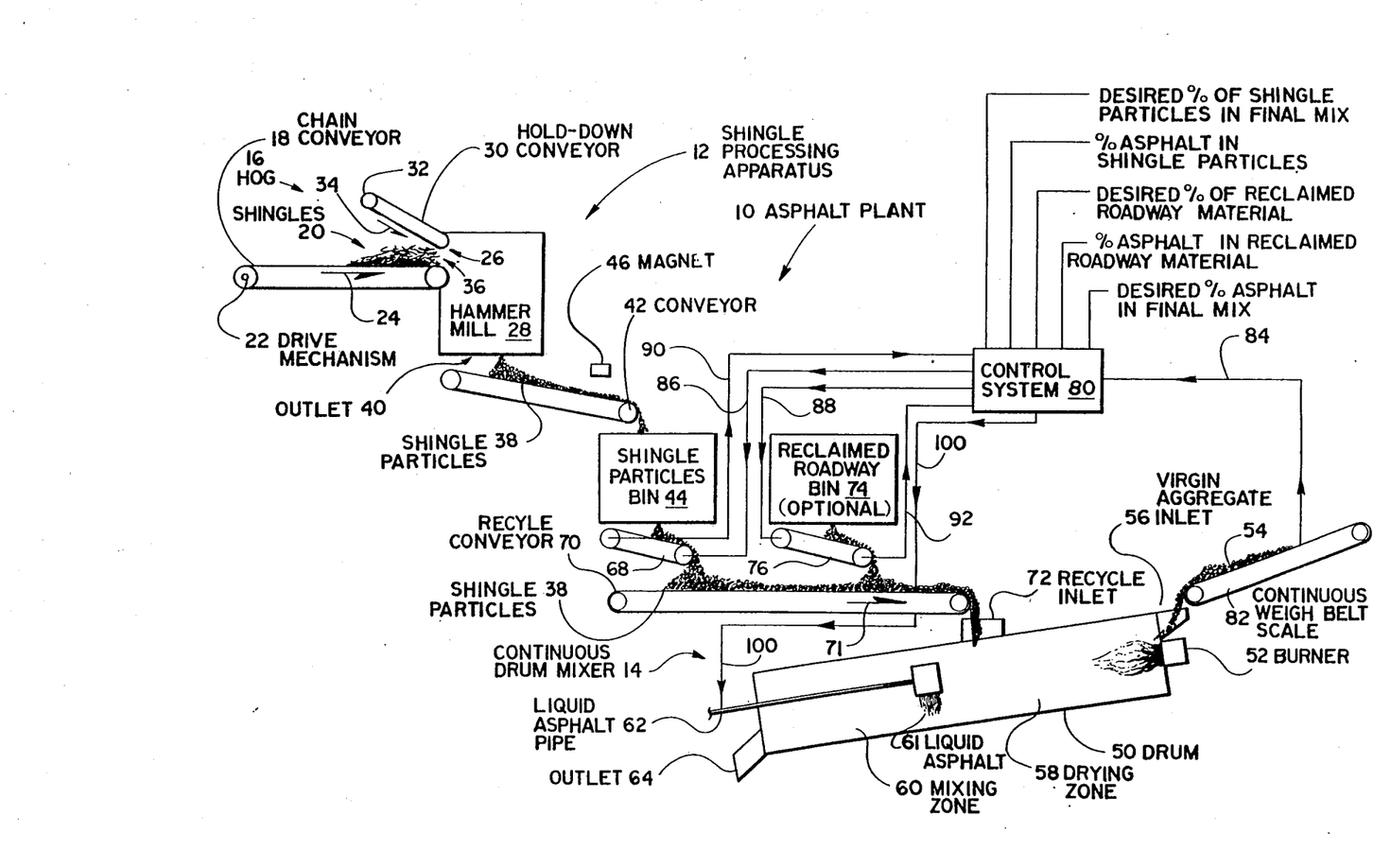
The FIGURE is a schematic drawing of an asphalt plant according to the preferred embodiment of the present invention.

Referring now in more detail to the drawing, the figure shows a continuous drum mix asphalt plant 10 including a shingle processing apparatus 12 and a continuous drum mixer 14 according to the present invention. While the preferred embodiment is disclosed with respect to a continuous drum mix asphalt plant, it will be appreciated that the method and apparatus disclosed herein can be easily adapted for use with other types of asphalt plants, including batch mix plants.

The shingle processing apparatus 12 includes a hog 16 such as is commonly found in the wood processing industry. The hog 16 of the disclosed embodiment is a Jeffrey Horizontal WBH Hog manufactured by Dresser Industries, Inc. of Woodruff, S.C., and is disclosed in U.S. Pat. No. 3,825,192, which patent is incorporated herein by reference. The hog 16 includes a chain conveyor 18 onto which shingles 20 are fed. The chain conveyor 18 is driven by a conventional drive mechanism 22 to move in the direction indicated by the arrow 24 to carry the shingles to the inlet 26 of a hammer mill 28.

Because the surfaces of shingles exhibit such high frictional resistance to sliding, there is a tendency for the shingles to stick together in a large pile, which could lead to jamming at the inlet 26 or overloading the hammer mill 28. In order to cope with this tendency, the hog 16 of the preferred embodiment includes a holddown conveyor 30 disposed with its lower end adjacent the hammer mill inlet 26 and driven by a conventional drive mechanism 32 to move in the direction indicated by the arrow 34. The spacing 36 between the chain conveyor 18 and the lower end of the holddown conveyor 30 can be controlled to limit the number of shingles which are introduced into the hammer mill 28 at one time. If the height of the pile of shingles 20 exceeds the spacing 36 between the chain conveyor 18 and the holddown conveyor 30, a limit switch (not shown) on the holddown conveyor is actuated, reversing the holddown conveyor to run in the direction opposite the arrow 34. In this manner, the shingles on top of the pile are dragged upward and backwards off the pile until the hammer mill has consumed the shingles on the bottom of the pile. The upper material then drops downward and is fed into the mill so that the shingles are fed into the hammer mill at no greater rate than can be comfortably handled. When the height of the pile of shingles no longer exceeds the spacing 36 between the chain conveyor 18 and the holddown conveyor 30, the limit switch on the holddown conveyor reverses the holddown conveyor again to resume its forward motion, as indicated by the arrow 34, to provide a positive feed of the shingles into the mill.

The hammer mill 28 comminutes the shingles to a size of one-quarter inch or smaller, preferably to a size of one-eighth inch or smaller. By comminuting the shingles to particles of these dimensions, the surface area of the particles is relatively small, and the tendency of the shingle material to stick together as a mass is consequently reduced. Accordingly, it is possible to flow and to meter the comminuted shingle particles in a controlled manner without having them hang together as a mass.

The shingle particles are withdrawn from the hammer mill 28 through an outlet 40 in the bottom of the mill and onto a conveyor 42, which carries the shingle particles to a shingle particle storage bin 44 for temporary storage. A magnet 46 above the conveyor 42 removes nails and other scrap metal from the shingle particles prior to their introduction into the storage bin 44.

The continuous drum mixer 14 is of the type well known to those skilled in the art and will be described herein only briefly. A drum 50 is mounted for rotation about its longitudinal axis and has a burner 52 mounted in its upper end. Virgin aggregate 54 is introduced through an inlet 56 in the upper end of the drum 50. Flights (not shown) on the interior of the drum tumble the aggregate through a flow of heated air in a drying zone 58 of the drum as the drum rotates.

Farther down the drum in a mixing zone 60 removed from the high temperatures proximate to the burner 52, liquid asphalt 61 is introduced into the drum through a pipe 62. By introducing the liquid asphalt into the drum 50 at a point removed from the intense heat of the burner 52, heavy smoking from the liquid asphalt is eliminated. The contents of the drum are thoroughly mixed by tumbling through the mixing zone 60 and are withdrawn through an outlet 64 in the lower end of drum in the manner well known to those skilled in the art.

Comminuted shingle particles are metered from the bin 44 by a continuous-weight belt scale 68. An example of an apparatus for controlling the rate at which material is dispensed from a storage bin is found in U.S. Pat. No. 4,222,498, which patent is hereby incorporated by reference. The belt-scale 68 feeds the shingle particles onto a recycle conveyor 70, by which they are carried in the direction indicated by the arrow 71 to a recycle inlet 72. The shingle particles are introduced through the recycle inlet 72 into the interior of the drum 50 at the lower portion of the drying zone 58. If desired, reclaimed roadway material can be metered from a bin 74 by another continuous-weigh belt scale 76 onto the recycle conveyor 70, where it is introduced along with the shingle particles through the recycle inlet 72 into the interior of the drum 50.

A control system 80 controls the rates at which shingle particles, reclaimed roadway material, and liquid asphalt are introduced into the interior of the drum to maintain the proper proportions between the various elements which comprise the final mix. The control system 80 is preferably a microprocessor programmable by one skilled in the art when the control functions of the present invention are provided. The desired percentage of shingle particles in the final mix, the percentage of asphalt in the shingle particles, and the desired proportion of asphalt in the final mix are entered into the control system manually. A continuous weigh belt scale 82 measures the rate at which virgin aggregate is being fed into the drum and sends a signal 84 to the control system 80. Responsive to the signal 84, the control system sends a signal 86 to the belt scale 68 to control the rate at which shingle particles are fed from the shingle particles bin 44 onto the recycle conveyor 70 in order to maintain a constant proportion to the virgin aggregate.

If reclaimed roadway material is being recycled, the desired percentage of reclaimed roadway material in the final mix and the percentage of asphalt in the reclaimed roadway material are also manually entered into the control system 80. The control system further sends a signal 88 to the belt scale 76 to control the rate at which reclaimed roadway material is being fed from the reclaimed roadway bin 74 onto the recycle conveyor 70, again maintaining a constant proportion to the virgin aggregate.

Since both the shingle particles and the reclaimed roadway material contain asphalt, the amount of liquid asphalt introduced into the drum must be adjusted accordingly so that the final asphalt product will have the desired asphalt content. Accordingly, signals 90 and 92 from the continuous-weigh belt scales 68, 76 are sent to the control system 80. Appropriately programmed conventional microprocessors, knowing the percentage of shingle particles in the mix and the percentage of asphalt in the shingle particles, can compute the percentage of asphalt added to the mix by way of the recycled shingle material. Similarly, if reclaimed roadway material is being recycled, the control system 80 can calculate the percentage of asphalt added to the final mix from the recycled roadway material, based upon the percentage of the mix comprised by reclaimed roadway material and the percentage of asphalt in the reclaimed roadway material. With the percentage of asphalt from these two sources known, and with the desired percentage of asphalt in the final product known, the control system 80 sends a signal 100 to control the rate at which liquid asphalt is introduced into the drum to bring the total asphalt content of the composition to the desired level. Apparatus for controlling the rate at which liquid asphalt is introduced into the drum are well known in the art. An example of such an apparatus is disclosed in U.S. Pat. No. 4,218,145, which patent is incorporated herein by reference.

Referring now to the operation of the asphalt plant 10 according to the disclosed embodiment, shingles 20 are fed onto the chain conveyor 18 to be fed into the hammer mill 28. If the shingles 20 tend to hang together as a mass, which might cause jamming at the inlet 26 of the hammer mill 28 or overloading of the hammer mill, the holddown conveyor 30 engages the shingles on top of the pile and prevents them from advancing until the shingles beneath have been fed into the hammer mill. At that point, the topmost shingles fall downwardly away from the holddown conveyor 30 and onto the chain conveyor 18, whereby they are fed into the hammer mill 28. The opening 36 between the lower end of the holddown conveyor 30 and the chain conveyor 18 can be adjusted so that shingles are not fed into the hammer mill faster than the mill can comminute the shingles.

The hammer mill 28 comminutes the shingles to particles of one-quarter inch or less, preferably to particles of one-eighth inch or less. The shingle particles are withdrawn through the outlet 40 in the bottom of the hammer mill 28 and onto a conveyor 42.

The magnet 46 removes nails and other scrap metal from among the shingle particles on the conveyor as the shingle particles are transported to the shingle particle storage bin 44.

Meanwhile, virgin aggregate 54 is being fed into the drum 50 through the inlet 56 in the upper end of the drum. The continuous weigh belt scale 82 sends a signal 84 to the control system 80. In turn, responsive to the desired percentage of shingle particles in the final mix programmed into the control system 80 by the operator, the control system sends a signal 86 to the belt scale 68 to control the rate at which shingle particles are fed from the shingle particle storage bin 44 onto the recycle conveyor 70. If reclaimed roadway material is also being recycled, the desired percentage of reclaimed roadway material in the final mix is programmed into the control system 80 by the operator. The control system 80 then sends a signal 88 to the belt scale 76 to control the rate at which reclaimed roadway material is fed from the roadway recycle storage bin 74 onto the recycled conveyor 70. In this manner, the rate at which shingle particles and reclaimed roadway material are dispensed from their respective bins is controlled to maintain the proper proportions to the virgin aggregate being introduced into the drum.

The shingle particles and reclaimed roadway material are fed from the recycle conveyor 70 into the recycle inlet 74 and introduced into the lower portion of the drying zone 58 in the interior of the drum 50. The virgin aggregate, shingle particles, and reclaimed roadway material are tumbled through the flow of heated air such that the asphalt in the shingle particles and in the reclaimed roadway material melts. As the asphalt melts, and as the materials are mixed together, some of the liquified asphalt is transferred from the shingle particles and reclaimed roadway material to the virgin aggregate.

Signals 90 and 92 from the continuous-weigh belt scales 68, 76 apprise the control system 80 of the rates at which shingle particles and reclaimed roadway material are being fed into the drum. The asphalt content of the shingle particles is input into the control system by the operator. For shingles manufactured prior to 1980, the asphalt content is 52%. For shingle by-products manufactured since 1980, the asphalt content is 25%. Based upon the rate at which shingle particles are being fed into the drum, and based upon the known percentage of asphalt in the shingle particles, the percentage of asphalt in the mix derived from the shingle particles can be computed. Similarly, the operator inputs the asphalt content of the reclaimed roadway material into the control system, and, with the percentage of reclaimed roadway material in the mix being known, the amount of asphalt in the mix derived from the reclaimed roadway material can be computed. The operator then inputs the desired asphalt content of the final composition into the control system 80.

With the amount of asphalt from the shingles being known, the amount of asphalt from the reclaimed roadway material being known, and the desired asphalt content of the final mixture being known, the amount of liquid asphalt introduced into the drum is controlled by the signal 100 from the control system to maintain the proper proportion of asphalt in the final paving composition. Liquid asphalt is then introduced into the mixing portion of the drum at the controlled rate. The liquid asphalt, virgin aggregate, shingle particles, and reclaimed roadway material are all thoroughly intermixed in the mixing zone 60 to form a substantially homogenous paving composition. The paving composition is then withdrawn through the outlet in the lower end of the drum, where it is stored in a conventional manner.

The percentage of the paving composition which can be comprised of shingle particles is limited by the desired total asphaltic content of the paving composition and by the hardness of the asphalt in the shingle particles. Shingles are manufactured using a relatively hard asphalt. In order to compensate for the harder asphalt in the shingle material, a softer liquid asphalt must be used. Since there are limitations on how soft a liquid asphalt can be, the proportion of the asphalt which can be contributed by feeding recycled shingle material into the mix is necessarily limited to that proportion whose hardness can be offset by the use of the softest possible liquid asphalt.

The hardness of asphalt is expressed in terms of its "penetration number", with harder asphalts having lower penetration numbers, and softer asphalts having higher penetration numbers. The overall asphalt content of the paving mix, under present-day standards, should have a penetration number of from 50 to 60, while the penetration number of the asphalt in shingles is usually around 11. Using even an extremely soft liquid asphalt having a penetration number of 250, by reference to standard asphalt blending charts it can be determined that only about 40% of the asphalt in the mix can be contributed from shingles if the overall hardness of the asphalt in the mix is to be maintained within the 50 to 60 standard. Since the overall asphalt content of the mix is only 5-6%, it can be seen that only 40% of the 5-6%, or around 2% of the mix, can comprise asphalt from the shingle particles. If shingles having an asphalt content of 25% are used, only up to about 8% of a mix within normal specifications can comprise shingle particles, even using the softest liquid asphalt.

If harder liquid asphalts are used, or if shingles having a higher proportion of asphalt are employed, the percentage of such a mix which can be comprised of shingle particles is further reduced. Using a more typical liquid asphalt with a penetration number of 80 to 90, 14% to 20% of the 5-6% asphalt in the mix can be comprised of asphalt from shingles, or approximately 1% of the mix. Since some shingles have an asphalt content of as much as 52%, that would mean that only about 2% of the mix could be comprised of shingle particles. Thus, depending upon the hardness of the liquid asphalt used and the proportion of asphalt and the single material, a maximum of from 2% to 8% of the mix can be comprised of shingle particles.

When reclaimed roadway material is also being recycled, the percentage of shingles in the mix is further reduced. Typically, reclaimed roadway material includes asphalt having a penetration number of from 30 to 50, depending upon its age. Thus, the liquid asphalt must not only be able to offset the hardness of the asphalt in the shingle material but also of the asphalt in the reclaimed roadway material.

An important feature of the present invention is the reduction of the shingle material to small particles which can be easily flowed and metered. This reduction in size is important for two reasons: first, the particles must be small enough to completely melt during the short time in which the shingle particles are subjected to the high heat of the mixing zone of the drum. Large chunks of shingle material will not completely melt and consequently will not become uniformly interspersed with the other materials comprising the paving composition.

Secondly, because of the propensity for larger pieces to hang together as a mass, accurately metering larger pieces of shingle material into the asphalt plant can be difficult. As will be seen, even minor variances in the amount of shingle material introduced into the asphalt plant can have a significant impact on the overall proportion of asphalt in the paving composition.

Generally, the asphalt content of a paving composition under most state standards must be maintained within plus or minus 0.2%. In order to maintain this tolerance, it is required that liquid asphalt be metered into the asphalt plant to within an accuracy of 0.5%. Since the shingle particles contain a significant portion of asphalt, the shingle particles should also be metered accurately within that same 0.5% range. Since the shingle particles will generally comprise no more than 8% and preferably 2 to 4% of the paving composition, and since the metering of the shingle particles must be accurate to within ½ of 1% of the 2 to 4% shingle particles that are being added, even minor variations in the amount of shingle particles introduced into the asphalt plant can throw the total asphaltic content of the paving composition outside its range of tolerance.

While the preferred embodiment of the present invention has been disclosed with respect to a microprocessor-based control system for controlling the proportions of the various components comprising the final mix, it will be appreciated that other methods and apparatus for controlling these proportions may be employed without departing from the scope of the present invention. For example, the signal 84 from the continuous weigh belt scale 82 feeding virgin aggregate into the drum could be connected to a gauge in an operator's booth. Responsive to the reading on that gauge, an operator could manually control the rates at which shingle particles and reclaimed roadway material are fed into the drum by sending the signals 86 and 88 to the respective continuous weight belt scales. By performing manual calculations or consulting a chart or the like, the operator could determine how much liquid asphalt is required to bring the total asphaltic content of the mix to its desired level. He could then manually adjust the rate at which liquid asphalt is introduced into the drum.

Finally, it will be understood that the preferred embodiment of the present invention has been disclosed by way of example, and that other modifications may occur to those skilled in the art without departing from the scope and spirit of the appended claims.

What is claimed is:

1. An asphalt plant comprising:
   means for heating and drying measured amounts of virgin aggregate;
   means for comminuting asphaltic roofing shingles having a known percentage by weight of asphalt to particles of a size which can be accurately flowed and metered;
   means for introducing said shingle particles into said asphalt plant such that said shingle particles are heated to melt the asphalt in said shingle particles and mixed with said virgin aggregate to from a mixture;
   means for introducing measured amounts of liquid asphalt into said asphalt plant;
   means for mixing said liquid asphalt with said mixture of shingle particles and virgin aggregate to form an asphalt paving composition;
   means for measuring the amount of shingle particles introduced into said asphalt plant, whereby the amount of asphalt introduced into said asphalt plant as a result of the introduction of said shingle particles can be calculated based upon the measured amount of shingle particles and the known percentage of asphalt in said shingle particles; and
   means for controlling the amount of liquid asphalt introduced into said asphalt plant such that the total amount of asphalt in said paving composition from said shingle particles and from said liquid asphalt constitutes a desired proportion of said paving composition.

2. The shingle recycling apparatus of claim 1, further comprising means for controlling the rate at which said shingle particles are introduced into said asphalt plant such that said shingle particles are introduced at a rate in predetermined proportion by weight to the rate at which aggregate is introduced into said asphalt plant, whereby said shingle particles comprise a desired proportion of said paving composition.

3. The shingle recycling apparatus of claim 1, further comprising means for calculating the amount of asphalt from said shingle particles in said mixture based upon the measured amount of shingle particles in said mixture and the known amount of asphalt in said shingles.

4. The shingle recycling apparatus of claim 3, wherein said means for controlling the amount of liquid asphalt introduced into said asphalt plant is responsive to said calculated proportion of asphalt from said shingle particles to control the amount of liquid asphalt introduced such that the total amount of asphalt in said paving composition from said shingle particles and from said liquid asphalt constitutes a desired proportion of said paving composition.

5. The shingle recycling apparatus of claim 1, further comprising a microprocessor-based control system comprising:
   means for inputting a signal corresponding to the desired proportion of said paving composition which is to consist of said shingle particles;
   means responsive to said input of said desired shingle particles proportion and to said measured amount of aggregate introduced into said asphalt plant for controlling the amount of said shingle particles introduced into said asphalt plant;
   means for inputting a signal corresponding to said known percentage by weight of asphalt in said shingles;
   means responsive to said measured amount of shingle particles in said mixture and said input percentage of asphalt in said shingles for calculating the amount of asphalt from said shingle particles in said mixture of shingles and aggregate;

means for inputting a signal corresponding to the desired total proportion of said paving composition which is to consist of asphalt; and means responsive to said calculated amount of asphalt from said shingle particles and to said input of said desired total asphalt proportion for controlling the amount of liquid asphalt introduced into said asphalt plant.

6. The shingle recycling apparatus of claim 1, wherein said means for comminuting said shingles comprises means for comminuting said shingles to particles of no greater than one-quarter of an inch in size.

7. The shingle recycling apparatus of claim 1, wherein said means for comminuting said shingles comprises means for comminuting said shingles to particles of no greater than one-eighth of an inch in size.

8. The shingle recycling apparatus of claim 1, wherein said means for comminuting said shingles comprises:

a mill for comminuting said shingles;

a first conveyor means for feeding said shingles into said mill; and a second conveyor means disposed in spaced apart relation above said first conveyor means and operative when a pile of shingles exceeding a predetermined height accrues on said first conveyor means to reverse the flow of the uppermost shingles of said pile of shingles, whereby the rate at which shingles are introduced into said mill is controlled.

9. The shingle recycling apparatus of claim 1, further comprising:

means for introducing reclaimed asphalt roadway material having a known proportion by weight of asphalt into said asphalt plant such that said reclaimed roadway material is mixed with said shingle particles and said aggregate to form a mixture and is heated to melt the asphalt in said reclaimed roadway material; and means for measuring the amount of reclaimed roadway material introduced into said asphalt plant, whereby the amount of asphalt introduced into said asphalt plant as a result of the introduction of said reclaimed roadway material can be calculated based upon the measured amount of reclaimed roadway material and the known percentage of asphalt in said reclaimed roadway material, whereby the amount of liquid asphalt introduced into said mixing means is controlled such that the total amount of asphalt in said paving composition from said reclaimed roadway material, from said shingle particles, and from said liquid asphalt constitutes a desired proportion of said paving composition.

10. The shingle recycling apparatus of claim 9, further comprising means for controlling the rate at which said reclaimed roadway material is introduced into said asphalt plant such that said reclaimed roadway material is introduced at a rate in predetermined proportion by weight to the rate at which aggregate is introduced into said asphalt plant, whereby said reclaimed roadway material comprises a desired proportion of said paving composition.

11. The shingle recycling apparatus of claim 9, further comprising:

means for calculating the amount of asphalt from said shingle particles in said mixture based upon the measured amount of shingle particles in said mixture and the known amount of asphalt in said shingles; and means for calculating the amount of asphalt from said reclaimed roadway material in said mixture based upon the measured amount of reclaimed roadway material in said mixture and the known amount of asphalt in said reclaimed roadway material.

12. The shingle recycling apparatus of claim 11, wherein said means for controlling the amount of liquid asphalt introduced into said asphalt plant is responsive to said calculated amounts of asphalt from said shingle particles and from said reclaimed roadway material to control the amount of said liquid asphalt introduced such that the total amount of asphalt in said paving composition from said shingle particles, from said reclaimed roadway material, and from said liquid asphalt constitutes a desired proportion of said paving composition.

13. The shingle recycling apparatus of claim 9, further comprising a microprocessor-based control system comprising:

means for inputting a signal corrsponding to the desired proportion of said paving composition which is to consist of said shingle particles;

means for inputting a signal corresponding to the desired proportion of said paving composition which is to consist of said reclaimed roadway material;

means responsive to said input of said desired shingle particles proportion, to said input of said desired reclaimed roadway material proportion, and to said measured amount of aggregate introduced into said asphalt plant for controlling the amount of said shingle particles and the amount of reclaimed roadway material introduced into said asphalt plant;

means for inputting said known percentage by weight of asphalt in said shingles;

means responsive to said controlled amount of shingle particles in said mixture and to said input percentage of asphalt in said shingles for calculating the amount of asphalt from said shingle particles in said mixture of shingles and aggregate;

means for inputting said known percentage by weight of asphalt in said reclaimed roadway material;

means responsive to said controlled amount of reclaimed roadway material in said mixture and to said input percentage of asphalt in said reclaimed roadway material for calculating the amount of asphalt from said reclaimed roadway material in said mixture of shingles, reclaimed roadway material, and aggregate;

means for inputting a signal corresponding to the desired total proportion of said paving composition which is to consist of asphalt; and means responsive to said calculated amounts of asphalt from said shingle particles and from said reclaimed raodway material and responsive to said input of said desired total asphalt proportion for controlling the amount of liquid asphalt introduced into said asphalt plant.

14. An apparatus for manufacturing asphalt paving composition comprising:

a drum mixer mounted for rotation about its longitudinal axis;

means for continuously introducing virgin aggregate into said drum mixer;

means for measuring the rate at which virgin aggregate is introduced into said drum mixer;

means for comminuting asphaltic shingles having a known percentage by weight of asphalt to particles which can be accurately flowed and metered;

means for continuously introducing said shingle particles into said drum mixer such that said shingle particles are mixed with said aggregate in said drum mixer to form a mixture;

burner means in communication with the interior of said drum mixer for heating said mixture to heat and dry said aggregate and to melt the asphalt in said shingle particles;

means for measuring the rate at which shingle particles are introduced into said asphalt plant, whereby the rate at which asphalt is introduced into said drum mixer from said shingle particles can be calculated based upon the measured rate of shingle particle introduction and the known percentage of asphalt in said shingle particles;

means for continuously introducing liquid asphalt into a section of said drum mixer removed from said heating means such that said liquid asphalt is mixed with said mixture of aggregate and shingle particles to form an asphalt paving composition; and means for controlling the rate at which liquid asphalt is introduced into said drum mixer such that the proportion of total asphalt in said paving composition from said shingle particles and from said liquid asphalt constitutes a desired proportion of said paving composition.

15. The asphalt manufacturing apparatus of claim 14, further comprising means for controlling the rate at which said shingle particles are introduced into said drum mixer such that said shingle particles are introduced at a rate in predetermined proportion by weight to the rate at which aggregate is introduced into said drum mixer.

16. The asphalt manufacturing apparatus of claim 14, further comprising means for calculating the rate at which asphalt is introduced into said drum mixer from said shingle particles, based upon the measured rate of shingle particle introduction and the known amount of asphalt in said shingles.

17. The asphalt manufacturing apparatus of claim 16, wherein said means for controlling the rate at which liquid asphalt is introduced into said drum mixer is responsive to said calculated rate of asphalt from said shingle particles to control the rate at which liquid asphalt is introduced such that the total amount of asphalt in said paving composition from said shingle particles and from said liquid asphalt constitutes a desired proportion of said paving composition.

18. The asphalt manufacturing apparatus of claim 14, further comprising a microprocessor-based control system comprising:

means for inputting a signal corrsponding to the desired proportion of said paving composition which is to consist of said shingle particles;

means responsive to said input of said desired shingle particles proportion and to said measured rate at which aggregate is introduced into said asphalt plant for controlling the rate at which shingle particles are introduced into said drum mixer;

means for inputting said known percentage by weight of asphalt in said shingles;

means responsive to said measured rate at which shingle particles are introduced into said drum mixer and to said input percentage of asphalt in said shingles for calculating the rate at which asphalt from said shingle particles is introduced into said drum mixer;

means for inputting a signal corresponding to the desired total proportion of said paving composition which is to consist of asphalt; and means responsive to said calculated rate of asphalt from said shingle particles and to said input of said desired total asphalt proportion for controlling the amount of liquid asphalt introduced into said asphalt plant.

19. The asphalt manufacturing apparatus of claim 14, wherein said means for comminuting said shingles comprises means for comminuting said shingles to particles of no greater than one-quarter of an inch in size.

20. The asphalt manufacturing apparatus of claim 14, wherein said means for comminuting said shingles comprises means for comminuting said shingles to particles of no greater than one-eighth of an inch in size.

21. The shingle recycling apparatus of claim 14, wherein said means for comminuting said shingles comprises:

a mill for comminuting said shingles;

a first conveyor means for feeding said shingles into said mill; and a second conveyor means disposed in spaced apart relation above said first conveyor means and operative when a pile of shingles exceeding a predetermined height accures on said first conveyor means to reverse the flow of the uppermost shingles of said pile of shingles, whereby the rate at which shingles are introduced into said mill is controlled.

22. The asphalt manufacturing apparatus of claim 14, further comprising:

means for introducing reclaimed asphalt roadway material having a known proportion by weight of asphalt into said drum mixer such that said reclaimed roadway material is mixed with said shingle particles and said aggregate to form a mixture and is heated to melt the asphalt in said reclaimed roadway material; and means for measuring the rate at which reclaimed roadway material is introduced into said asphalt plant, whereby the rate at which asphalt is introduced into said drum mixer as a result of the introduction of said reclaimed roadway material can be calculated based on the measured rate of introduction of reclaimed roadway material and the known percentage of asphalt in said reclaimed roadway material, whereby the rate at which liquid asphalt is introduced into said drum mixer is controlled such that the total proportion of asphalt in said paving composition from said reclaimed roadway material, from said shingle particles, and from said liquid asphalt constitutes a desired proportion of said paving composition.

23. The asphalt manufacturing apparatus of claim 22, further comprising means for controlling the rate at which said reclaimed roadway material is introduced into said drum mixer such that said reclaimed roadway material is introduced at a rate in predetermined proportion by weight to the rate at which aggregate is introduced into said asphalt plant, whereby said reclaimed roadway material comprises a desired proportion of said paving composition.

24. The asphalt manufacturing apparatus of claim 22, further comprising:

means for calculating the rate at which asphalt is introduced from said shingle particles into said drum mixer based upon the measured rate of shingle particle introduction into said drum mixer and the known amount of asphalt in said shingles; and means for calculating the rate at which asphalt is introduced from said reclaimed roadway material into said drum mixer based upon the measured rate of reclaimed roadway material introduction into said drum mixer and the known amount of asphalt in said reclaimed roadway material.

25. The asphalt manufacturing apparatus of claim 24, wherein said means for controlling the rate at which liquid asphalt is introduced into said drum mixer is responsive to said calculated rates of introduction of asphalt from said shingle particles and from said reclaimed roadway material to control the rate at which said liquid asphalt in said paving composition fro shingle particles, from said reclaimed roadway material, and from said liquid asphalt constitutes a desired proportion of said paving composition.

26. The asphalt manufacturing apparatus of claim 22, further comprising a microprocessor-based control system comprising:

means for inputting a signal corresponding to the desired proportion of said paving composition which is to consist of said shingle particles;

means for inputting a signal corresponding to the desired proportion of said paving composition which is to consist of said reclaimed roadway material;

means responsive to said input of said desired shingle particles proportion, to said input of said desired reclaimed roadway material proportion, and to said measured rate at which aggregate is introduced into said drum mixer for controlling the rates at which said shingle particles and said reclaimed roadway material are introduced into said drum mixer;

means for inputting a signal corresponding to said known percentage by weight of asphalt in said shingles;

means responsive to said measured rate at which single particles are introduced into said drum mixer and to said input percentage of asphalt in said shingles for calculating the rate at which asphalt from said shingle particles is introduced into said drum mixer;

means for inputting a signal corresponding to said known percentage by weight of asphalt in said reclaimed roadway material;

means responsive to said measured rate at which reclaimed roadway material is introduced into said drum mixer and to said input percentage of asphalt in said reclaimed roadway material for calculating the rate at which asphalt from said reclaimed roadway material is introduced into said drum mixer;

means for inputting a signal corresponding to the desired total proportion of said paving composition is to consist of asphalt; and means responsive to said calculated rates at which asphalt is introduced into said drum mixer from said shingle particles and from said reclaimed roadway material, and responsive to said input of said desired total asphalt proportion for controlling the rate at which liquid asphalt is introduced into said drum mixer.

27. A method for manufacturing asphalt-aggregate paving composition having a predetermined proportion by weight of asphalt, said method comprising the steps of:

comminuting asphaltic shingles having a known proportion by weight of asphalt to particles of a size which can be accurately flowed and metered;

combining a measured amount of shingle particles and a measured amount of virgin aggregate to form a mixture;

heating said mixture to heat and dry said aggregate and to melt the asphalt in said shingle particles;

calculating the amount of asphalt in said mixture based upon the measured amount of shingle particles and the known proportion by weight of asphalt in said shingles;

introducing a controlled amount of liquid asphalt into said mixture such that the amount of total asphalt in said mixture from said shingle particles and said liquid asphalt constitutes said predetermined proportion; and mixing said aggregate, said shingle particles, and said liquid asphalt to form an asphalt paving composition.

28. The process of claim 27, further comprising the step of controlling the hardness of said liquid asphalt to compensate for the hardness of the asphalt in said shingle particles.

29. The process of claim 27, wherein said step of comminuting said asphaltic shingles comprises comminuting said shingles to particles of no greater than one-quarter of an inch.

30. The process of claim 27, wherein said step of comminuting said asphaltic shingles comprises comminuting said shingles to particles of no greater than one-eighth of an inch.

31. A method for manufacturing asphalt-aggregate paving composition having a predetermined proportion by weight of asphalt, said method comprising the steps of:

comminuting asphaltic shingles having a known proportion by weight of asphalt to particles of a size which can be accurately flowed and metered;

combining measured amounts of shingle particles, reclaimed asphalt roadway material having a known proportion by weight of asphalt, and virgin aggregate to form a mixture;

heating said shingle particles and said reclaimed roadway material to melt the asphalt therein;

calculating the amount of asphalt in said mixture from said shingles based upon the measured amount of shingle particles and the known proportion by weight of asphalt in said shingles;

calculating the amount of asphalt in said mixture from said reclaimed roadway material based upon the measured amount of recycle material and the known proportion by weight of asphalt in said recycle material;

introducing a controlled amount of liquid asphalt into said mixture such that the amount of total asphalt in said mixture from said shingle particles, said reclaimed roadway material, and said liquid asphalt constitutes said predetermined proportion; and mixing said shingle particles, said reclaimed roadway material, said aggregate, and said liquid asphalt to form an asphalt paving composition.

32. The process of claim 31, further comprising the step of controlling the hardness of said liquid asphalt to compensate for the hardness of the asphalt in said shingle particles and in said reclaimed roadway material.

33. The process of claim 31, wherein said step of comminuting said asphaltic shingles comprises comminuting said shingles to a size of no greater than one-quarter of an inch.

34. The process of claim 31, wherein said step of comminuting said asphaltic shingles comprises comminuting said shingles to a size of no greater than one-eighth of an inch.

* * * * *